United States Patent [19]

Walch

[11] Patent Number: 5,507,136
[45] Date of Patent: Apr. 16, 1996

[54] MOWER WITH A CUTTING DEVICE AND SUPPORTING STRUCTURE

[75] Inventor: Martin Walch, Dettwiller, France

[73] Assignee: Kuhn S.A., Saverne Cedex, France

[21] Appl. No.: 385,435

[22] Filed: Feb. 8, 1995

[30] Foreign Application Priority Data

Aug. 2, 1994 [FR] France ................................. 94 01553

[51] Int. Cl.$^6$ ................................................. A01D 34/66
[52] U.S. Cl. ............................................. 56/6; 56/DIG. 17
[58] Field of Search ............................... 56/6, 15.2, 16.4, 56/16.9, 255, 295, DIG. 20, DIG. 17

[56] References Cited

U.S. PATENT DOCUMENTS

| | | | |
|---|---|---|---|
| 4,860,527 | 8/1989 | Maarten | 56/6 X |
| 5,076,042 | 12/1991 | Koorn et al. | 56/6 |

FOREIGN PATENT DOCUMENTS

| | | |
|---|---|---|
| 009134 | 4/1980 | European Pat. Off. . |
| 242311 | 10/1987 | European Pat. Off. . |
| 391478 | 10/1990 | European Pat. Off. . |
| 429382 | 5/1991 | European Pat. Off. . |
| 2089634 | 6/1992 | United Kingdom . |

*Primary Examiner*—Terry Lee Melius
*Attorney, Agent, or Firm*—Oblon, Spivak, McClelland, Maier & Neustadt

[57] ABSTRACT

A mower including at least one mowing group provided with a cutting device on an upper side of which are arranged cutting elements which rotate about upwardly directed axes by means of shafts which are rotatably guided in a housing of the cutting device. A supporting structure is arranged a distance above the cutting device and is connected to the cutting device, the supporting structure including a beam which extends transversely to a direction of travel of the mower. The mower also includes a strut, and a coupling device which connects the strut to the beam, the strut extending downward in the direction of one of the cutting elements, a bearing connecting the strut to the shaft of one of the cutting elements, the bearing having a pivot type guide, and the guide having an axis which merges with the axis of the shaft of said one of the cutting elements. The coupling device includes a connection member permitting, at a time of installation, translation and rotation of the strut along and about an axis which is at least substantially horizontal and which is directed at least substantially parallel to a plane containing the axes of rotation of the cutting elements so as to allow proper connection of the strut to the beam and wherein the coupling device further includes an immobilization apparatus which prohibits the translation and rotation of the strut.

20 Claims, 3 Drawing Sheets

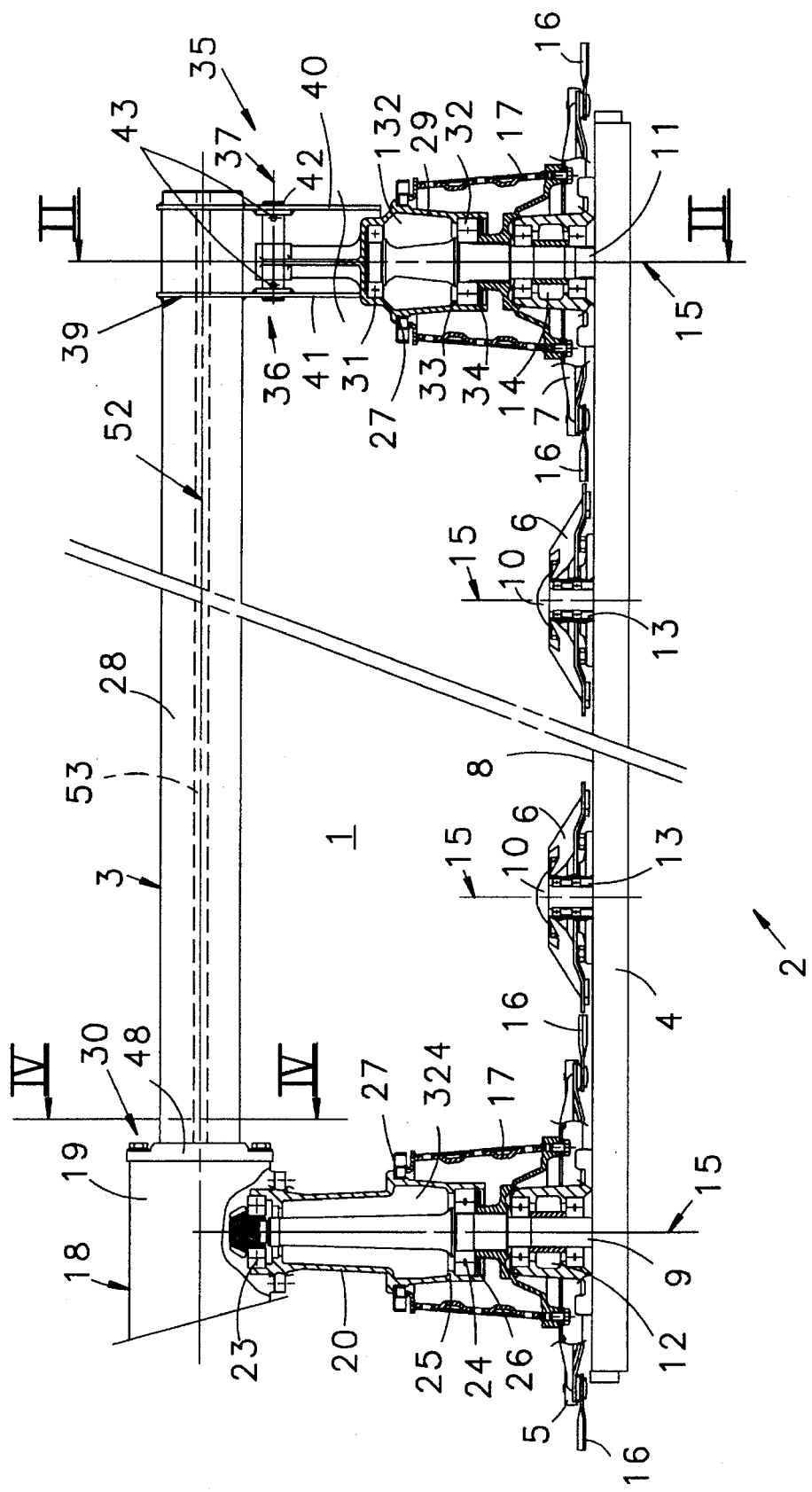

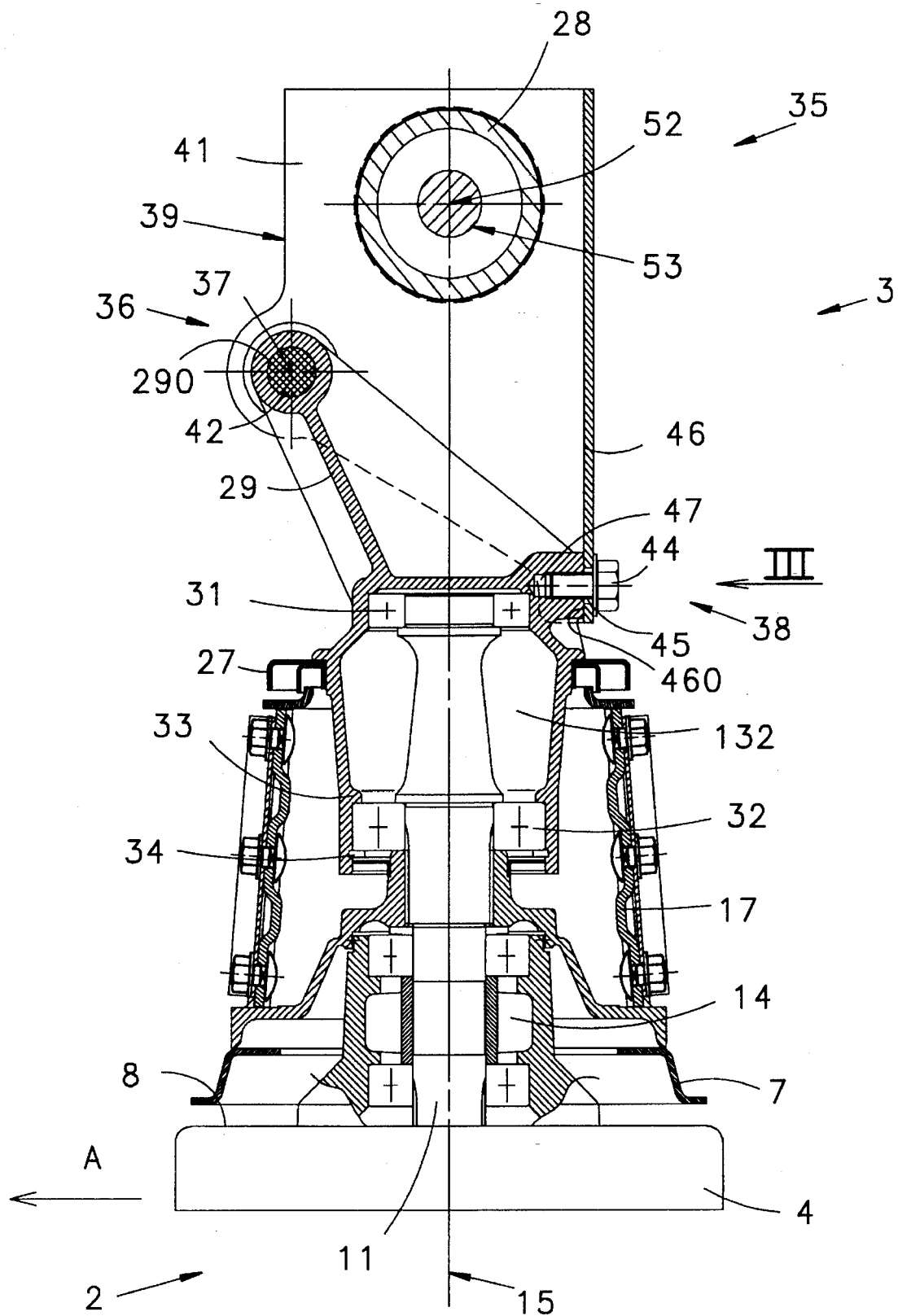

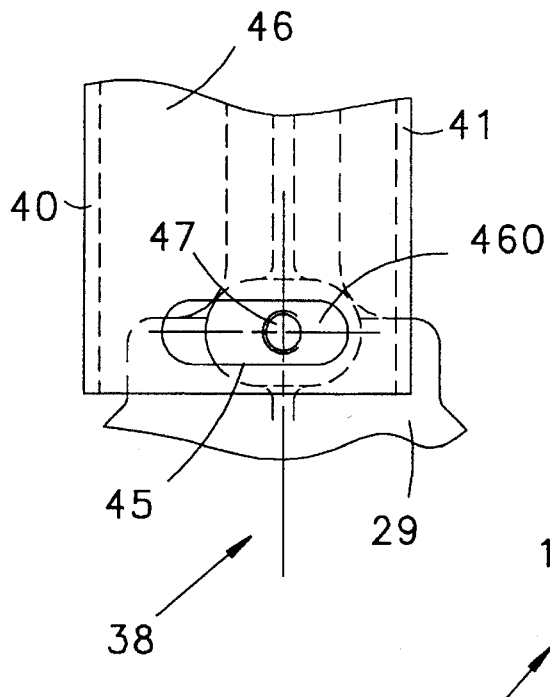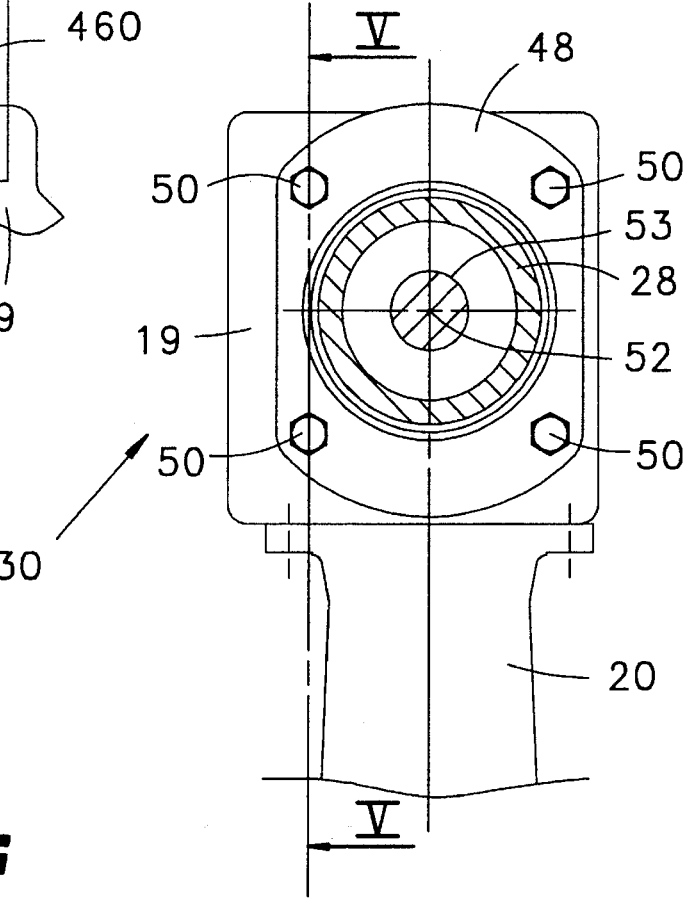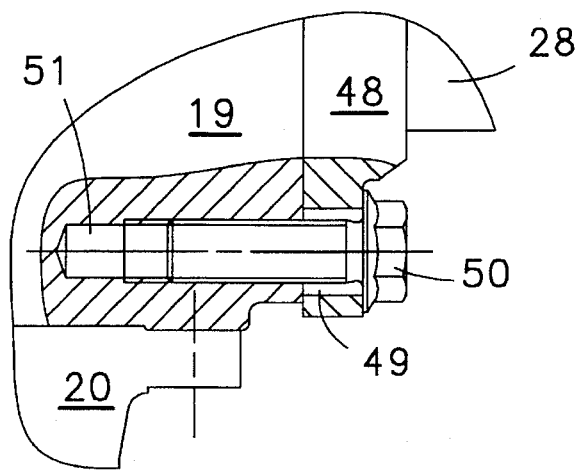

MOWER WITH A CUTTING DEVICE AND SUPPORTING STRUCTURE

BACKGROUND OF THE INVENTION

1. Field of the Invention

This invention pertains to a mower which includes at least one mowing group provided with a cutting device on an upper side of which are arranged cutting elements which rotate about upwardly directed axes by means of shafts which are guided in rotation in a housing of the cutting device, and a supporting structure arranged at a certain distance above the cutting device and connected to the cutting device. The supporting structure includes a beam which extends transversely in the forward direction, to which there is connected, by means of a coupling device, a strut extending downward in the direction of one of said cutting element of the cutting device, said strut being connected to the shaft of said one cutting element by means of a bearing having a pivot type guide, the axis of which is merged with the axis of the shaft of said one cutting element.

2. Discussion of the Background

A mower is known, for example in document EP 242,311, whose supporting structure is arranged a certain distance above the cutting device while being connected to the latter. Said supporting structure includes one member which extends transversely in the forward direction, to which there is connected a strut which extends downward in the direction of a cutting member of the cutting device. The strut is connected to the shaft of said cutting element by means of a bearing having a pivot type guide whose axis is merged with the rotational axis of the shaft of said cutting element. The coupling device which connects the strut to a beam (i.e. a longitudinal member) allows among other things pivot type articulation, in which the axis cuts across the rotational axis of the shaft of the corresponding cutting element, and is directed approximately perpendicular to the plane containing the rotational axis of the cutting elements. The supporting structure of this existing mower includes, in addition, means to compensate for deformations and/or manufacturing tolerances of the cutting device and/or the supporting structure. For this purpose the end of the beam which is located opposite the box of the transmission apparatus of the cutting device includes a head of the beam which extends between one of the flanges of the two angle brackets. This stringer head is provided with three oblong holes which are parallel to the direction of the cutting device housing. Holes provided in the flanges of the angle brackets extend opposite the oblong holes, and the holes are traversed by bolts which allow one to secure the beam of the head to the angle brackets. The oblong holes allow one to vary the length of the supporting structure between the aforementioned articulation and the end of the supporting structure which is set a certain distance from the strut.

Because of these means the installation of the supporting structure on the cutting device is possible without introducing initial constraints (or significant initial constraints) into the construction, even if the housing of the cutting device and/or the beam are more or less deformed or if their sides are at the extreme limits of manufacturing tolerances.

SUMMARY OF THE INVENTION

The goal of this invention is to simplify these means which allow installation of the supporting structure on the cutting device, especially if the sides of the latter are at the extreme limits of manufacturing tolerances.

For this purpose the mower in accordance with the invention is characterized by the fact that the coupling device connecting the strut to the beam includes means which allow, at the time of installation, translation and rotation along and about an axis which is at least approximately horizontal and directed at least approximately parallel to the plane containing the axes of rotation of the cutting elements, and that said coupling device further includes in addition immobilization means which prohibit said possibility of translation and rotation of said strut.

According to a particularly advantageous implementation of the invention, the means which allow, at the time of installation, translation and rotation includes a sliding pivot type connection. Preferably this connection is of the short sliding pivot type.

According to another implementation, said means will also include an annular linear type connection.

In these implementations the beam will advantageously include a shell between the flanges of which the strut extends, preferably at the upper part of the strut. This strut, preferably at the upper part thereof, is connected to the shell by means of a journal whose longitudinal axis constitutes the axis of the sliding pivot type or annular linear type coupling. This journal will go through the flanges of the shell, as well as a bore made directly or indirectly in the strut, preferably in the upper part thereof.

According to an additional characteristic, said coupling will extend in front of the vertical plane containing the longitudinal axis of the beam. According to a further characteristic, said coupling extends lower than the beam.

According to yet another characteristic of the invention, the means for immobilization includes a mounting plate which is integral with the beam, a complementary area of which is integral with the strut against which the mounting plate is intended to rest to be placed, and an attachment element which secures the mounting plate to said complementary area.

Advantageously, the attachment element includes at least one screw which goes through a hole provided in the mounting plate, and is screwed into a threaded hole provided for this purpose in the complementary surface.

Preferably, the hole provided in the mounting plate is a hole which is oblong in a direction that is at least approximately parallel to the axis of the coupling.

According to another characteristic, the mounting plate will extend in a plane which is at least approximately parallel to the plane containing the rotational axes of the cutting elements.

According to a further characteristic of the invention, the means for immobilization will extend at least partially behind the plane containing the longitudinal axis of the beam.

Additionally, this means for immobilization extends at least partially lower than the means which allow, at the time of installation, translation and rotation.

According to another characteristic of the invention, the supporting structure is connected at its extremities to the ends of the cutting device, and the strut is connected to one of the ends of the beam and extends downward in the direction of the external cutting element located at the corresponding end of the cutting device.

According to a further characteristic of the invention, the beam extends, in a manner known in the art, at least approximately parallel to the housing of the cutting device, and the strut and beam extend at least approximately into the plane containing the rotational axes of the cutting elements.

According to yet another characteristic of the invention, the end of the beam which is separated from the strut is, in a manner known in the art, secured to a transmission mechanism which is attached to the cutting device and is used to cause rotation of the cutting elements.

Advantageously, the transmission mechanism extends, in a manner known in the art, above a cutting element of the cutting device, and a rotational drive of the cutting elements works by means of a shaft traversing said cutting element and joining the transmission mechanism to the drive elements located in the housing of the cutting device.

And also, the transmission mechanism is advantageously secured to one of the ends of the cutting device.

According to yet another characteristic of the invention, a transmission shaft intended to be used to drive complementary work elements is placed inside the beam.

BRIEF DESCRIPTION OF THE DRAWINGS

Other characteristics and advantages of the invention will appear in the following description with reference to the attached drawing which represents, by way of non-limiting example, one form of implementation of the mower in accordance with the invention wherein:

FIG. 1 presents an elevated view, partially in section, of the mowing group (i.e. cutting device and supporting structure) of a mower in accordance with the invention;

FIG. 2 represents a sectional view on an enlarged scale taken along plane II—II in FIG. 1 showing, among other things, the coupling device which connects the strut of the supporting structure to the beam of the latter;

FIG. 3 represents a partial view on an enlarged scale and taken in the direction of arrow III in FIG. 2 of the means for assembly of the coupling device connecting the strut to the beam (the screw not being shown);

FIG. 4 shows on an enlarged scale a sectional view taken along plane IV—IV in FIG. 1 of the attachment of the beam to the transmission mechanism of the mowing group; and FIG. 5 represents on an enlarged scale a sectional view taken along plane V—V in FIG. 4 of the attachment of the beam to the transmission mechanism of the mowing group.

DESCRIPTION OF THE PREFERRED EMBODIMENTS

The mower of FIG. 1 includes a mowing group 1 provided with a cutting device 2 and a supporting structure 3 whose function is, among other things, to make rigid the cutting device 2.

The cutting device 2 includes a housing 4 which supports a plurality of cutting elements 5, 6, 7 which extend to the upper side 8 of the housing 4. They are installed on respective shafts 9, 10, 11 which are caused to rotate in roller bearings 12, 13, 14 which are secured to the upper side 8 of the housing 4. These roller bearings 12, 13 and 14 are also used to axially connect the corresponding shaft 9, 10, 11 to the housing 4. These cutting elements 5, 6, 7 thus each turn about a respective axis 15 which is directed upward and preferably at least substantially vertical.

Each cutting element 5, 6, 7 is provided with a certain number of cutting tools 16. The two extreme outward cutting elements 5, 7 are installed under rotors 17, 17.

These rotors 17, 17 turn with the two extreme outward cutting elements 5, 7 and are also used to reduce the swath width of the cut product, which is placed behind the cutting device 2.

Rotational drive of the cutting elements 5, 6, 7 is achieved by drive elements, not shown, which are arranged, in a known manner, inside the housing 4 of the cutting device 2. Rotational drive of the drive elements is achieved by the shaft 9 of the first cutting element 5. For this purpose, shaft 9 is lengthened upwardly and enters a transmission mechanism 18 which includes a housing 19 and a barrel 20 which extends from the housing 19 downward in the direction of the first cutting element 5. The housing 19 contains, in a known manner, transmission elements which are coupled at the upper end of the shaft 9 of the first cutting element 5. These transmission elements which are housed inside the transmission mechanism 18 are themselves driven to rotate by means (not shown) which are attached, in a known manner, to a propulsive source such as, for example, from the tractor vehicle (not shown) to which the mower is attached.

In FIG. 1, one can see, moreover, that the upper part of the shaft 9 of the first cutting element 5 is guided in rotation in the barrel 20 by means of a bearing 324 which includes two rollers 23, 24. This bearing 324 is a pivot type guide for the shaft 9. In effect one can see that the shaft 9 is connected axially in the barrel 20 by means of a lower roller 24 which abuts on one the hand against a shoulder 25 of the barrel 20 and, on the other hand, against a circlip 26 installed in the barrel 20. Finally, one can see that the barrel 20 is also provided with a side plate 27 which closes off the upper part of the rotor 17 which extends above the first cutting element 5.

At a certain distance above the housing 4 of the cutting device 2 the supporting structure 3 extends outwardly. This supporting structure 3 includes a beam 28 and a strut 29. The beam extends at least approximately parallel to the housing 4, while the strut 29 extends downward in the direction of the upper cutting element 7. The beam 28 and the strut 29 thus extend at least approximately into the plane containing the rotational axes 15, 15 of the cutting elements 5, 6, 7. The supporting structure 3 is secured at its two extremities to the two extremities of the cutting device 2. The extremity of the beam 28 which is separated from the strut 29 is secured on the housing 19 of the transmission mechanism 18 by means of an attachment device 30 which will be described hereinafter, while the strut 29 is connected to the shaft 11 of the external cutting element 7. For this purpose, shaft 11 of the external cutting element 7 extends upward and enters the interior portion of the strut 29. The connection between the strut 29 and the upper part of the shaft 11 is achieved by means of a bearing 132 formed by two rollers 31, 32. This bearing 132 constitutes a guiding of a pivot type of the shaft 11. The axis of this guiding device is thus merged with the axis 15 of the shaft 11.

Shaft 11 is housed axially within the strut 29 by means of the lower roller 32 which abuts against, on the one hand, a shoulder 33 of the strut 29 and, on the other hand, against a circlip 34 which is installed in the strut 29. Strut 29 is also provided with a side plate 27 which blocks off the upper part of the rotor 17 extending above the outside cutting element 7.

In addition to their function of reducing the swath width of the cut forage arranged behind the cutting device 2, the rotors 17, 17 also prevent the stems of the cut product from becoming stuck to the barrel 20 and/or the strut 29. The connection between the beam 28 and the strut 29 is achieved by means of a coupling device 35.

FIGS. 2 and 3 show in greater detail that the coupling device 35 includes a coupling 36, of a sliding pivot type, whose axis 37 is at least approximately parallel to the plane containing the rotational axes 15, 15 of the cutting elements 5, 6, 7, and an immobilization device 38.

In the example shown, the coupling 36 is also of a short sliding pivot type. For this reason the beam 28 is provided with a shell cap 39 including two flanges 40, 41 between which the upper part of the strut 29 extends. This upper part of the strut 29 includes a bore 290 whose longitudinal axis constitutes the axis 37 of the coupling 36. In this manner the strut 29 can be connected to the flanges 40, 41 of the shell 39 of the beam 28 by means of a journal 42 which extends through the flanges 40, 41 of the shell 39 and the bore 290 of the upper part of the strut 29. After installation, axial displacement of the journal 42 is prevented by means of two cotter pins 43.

In FIG. 1, one can see that the two flanges 40, 41 of the shell are relatively offset with respect to one another, so as to allow the upper part of the strut 29 to have a certain sliding distance on the journal 42 along the longitudinal axis of the latter, which is merged with the axis 37 of the coupling 36.

The foregoing design allows assembly of the beam 28 and of the strut 29, in spite of manufacturing tolerances of the cutting device 2 and/or the beam 28 which increase in a direction which is at least approximately parallel to the longitudinal direction of the housing 4 of the cutting device 2 and of the beam 28, respectively.

In FIG. 2 one can see that the bore 290 of the upper part of the strut 29 sticks out in the direction of travel A, in front of the vertical plane containing the longitudinal axis 52 of the beam 28. This bore 290 extends additionally into a zone located between the beam 28 and the upper roller 31 of the bearing 132 connecting the strut 29 to the shaft 11.

To the rear, the beam 28 includes a mounting plate 46 which extends in a plane at least approximately parallel to the plane containing the rotational axes 15 of the cutting elements 5, 6, 7. This mounting plate 46 is intended to rest on a complementary surface area 460 of the strut. This complementary surface area has a threaded hole 47. The mounting plate 46, for its part, has an oblong hole 45 in a direction which is at least approximately parallel to the axis 37 of the coupling 36. A screw or bolt 44 passes through the oblong hole 45 and is screwed into the threaded hole 47 so as to secure the mounting plate 46 to the strut 29.

The mounting plate 46 with its oblong hole 45, the complementary surface area 460 and its threaded hole 47, as well as the screw 44 form the immobilization apparatus 38. As shown in FIG. 2, the attachment device 38 extends lower than coupling 36. In the example shown here it extends approximately to the level of the upper roller 31 of the bearing 132.

FIGS. 4 and 5 show in greater detail the attachment device 30 of the beam 28 on the cutting device 2, or more precisely on the housing 19 of the transmission mechanism 18 of the cutting device 2. For this purpose the extremity of the beam 28 located opposite the housing 19 includes a side plate 48 provided with holes 49 distributed uniformly on the latter. Through each hole 49 a screw 50 passes, which is screwed into a threaded hole (51) formed in the housing 19.

Installation of the supporting structure 3 on the cutting device 2 is accomplished in the following manner. The strut 29 is first pre-installed on the shaft 11 of the external cutting element 7 by means of rollers 31, 32 and the circlip 34. One next connects the beam 28 to the strut 29 by means of the journal 42. The side plate 48 of the beam 28 is then secured to the housing 19 by means of the screws 50. Then the coupling 36 is immobilized by means of the screw 44.

It is in this manner that the connection 36 shown herein can be replaced by another type of connection assuming that it allows translation and rotation along the axis 37. This connection can be of the annular linear type in particular.

The coupling device 35 in accordance with the invention is also particularly interesting when the mower includes a transmission shaft 53 placed inside the beam 28 in order to drive additional work elements (not shown), such as swath elements, treatment elements of the cut product by cutting elements 5, 6, 7, and so forth. Such a mower, is for example, described in the French patent application No. 2,654,896 of the applicant.

Obviously, numerous modifications and variations of the present invention are possible in light of the above teachings. It is therefore to be understood, that within the scope of the appended claims, the invention may be practiced otherwise than as specifically described herein.

What is claimed as new and desired to be secured by Letters Patent of the United States is:

1. A mower including:
   at least one mowing group provided with a cutting device on an upper side of which are arranged cutting elements which rotate about upwardly directed axes by means of shafts which are rotatably guided in a housing of the cutting device;
   a supporting structure arranged a distance above the cutting device and which is connected to the cutting device, said supporting structure including a beam which extends transversely to a direction of travel of the mower, a strut extending downward in the direction of one of said cutting elements, and a coupling device which connects said strut to said beam; and
   a bearing connecting said strut to the shaft of said one of the cutting elements, said bearing having an axis which merges with the axis of the shaft of said one of the cutting elements;
   said coupling device including a connection member permitting, upon installation, translation and rotation of the strut along and about an axis which is at least substantially horizontal and Which is directed at least substantially parallel to a plane containing the axes of rotation of the cutting elements so as to allow proper connection of said strut to said beam, and wherein said coupling device further includes an immobilization apparatus which prohibits said translation and rotation of said strut.

2. A mower according to claim 1, wherein the connection member includes a sliding pivot type coupling.

3. A mower according to claim 2, wherein the coupling comprises a short sliding pivot type coupling.

4. A mower according to claim 1, wherein the connection member which permits translation and rotation of the strut also includes an annular linear type coupling.

5. A mower according to claim 2, which comprises: flanges connected to the beam and between which the strut extends; and
   a journal which connects the strut to said flanges, said journal extending through the flanges and a bore of said strut, a longitudinal axis of said journal constituting said axis of said coupling device.

6. A mower according to claim 2, wherein the coupling extends in front of a vertical plane containing a longitudinal axis of the beam.

7. A mower according to claim 4, wherein the coupling extends in front of a vertical plane containing a longitudinal axis of the beam.

8. A mower according to claim 1, wherein the connection member is positioned so as to be lower than the beam.

9. A mower according to claim 1, wherein the immobilization apparatus comprises a mounting plate which is integral with the beam, a complementary surface onto which the mounting plate is intended to rest, and being integral with the strut and an attachment element connecting the mounting plate to said complementary surface.

10. A mower according to claim 9, wherein the mounting plate has a hole formed therein and the complementary surface has a threaded hole, and wherein the attachment element comprises at least one screw which passes through the hole provided in the mounting plate and is screwed into the threaded hole provided in the complementary surface.

11. A mower according to claim 10, wherein the hole provided in the mounting plate comprises an oblong hole which extends in a direction which is at least substantially parallel to the axis of the coupling device.

12. A mower according to claim 9, wherein the mounting plate extends in a plane which is at least substantially parallel to the plane containing the axes of rotation of the cutting elements.

13. A mower according to claim 1, wherein the immobilization apparatus extends at least partially behind a plane containing a longitudinal axis of the beam.

14. A mower according to claim 1, wherein the immobilization apparatus extends at least partially lower than the connection member.

15. A mower according to claim 1, wherein the supporting structure is connected at opposite ends thereof to ends of the cutting device and the strut is connected to one end of the beam and extends downwardly in a direction towards the external one of the cutting elements located at a corresponding end of the cutting device.

16. A mower according to claim 1, wherein the stringer extends at least substantially parallel to the housing of the cutting device and the beam and the strut extend at least substantially in the plane containing the axes of rotation of the cutting elements.

17. A mower according to claim 1, which further comprises a transmission mechanism attached to the cutting device, said transmission mechanism being provided to drive the cutting elements, and wherein the stringer is secured to the transmission mechanism at an end remote from the strut.

18. A mower according to claim 17, wherein the transmission mechanism extends above a cutting element, and wherein a shaft passes through said cutting element and connects the transmission mechanism to drive elements housed in the housing in order to drive the cutting elements.

19. A mower according to claim 17, wherein the transmission mechanism is secured to one end of the cutting device.

20. A mower according to claim 1, which comprises a transmission shaft housed inside the beam and wherein said transmission shaft is provided to drive complementary working elements.

* * * * *